Patented Aug. 8, 1950

2,518,028

UNITED STATES PATENT OFFICE 2,518,028

OPTICAL GLASS

Norbert J. Kreidl, Rochester, N. Y., assignor to Bausch & Lomb Optical Company, Rochester, N. Y., a corporation of New York No Drawing. Application June 23, 1947,
Serial No. 756,545

11 Claims. (Cl. 106—54)

The following is a specification of my improved optical glass of low silica content.

A variety of low-silica barium glasses have been developed for optical purposes. However, as a general rule it has been found that the stability of the glass is dependent upon the percentage of silica present and that reduction of the latter results in a water soluble product that is not stable. For this reason efforts to improve the optical characteristics of glass have been restricted to high silica compositions. Where the silica has been reduced, it has been thought necessary to consider that the product will be less stable.

Even lanthanum barium borosilicates containing oxides like $ZrO_2$, $ThO_2$, $Al_2O_3$, generally known to improve the chemical stability of glass, are chemically unstable and dissolve in carbonated water, sodium phosphate solution and acidic media in general.

I have found that the chemical stability of such low silica glasses can be improved materially by the incorporation in the fusion batch of two to ten per cent of either tantalum or columbium oxide and the subsequent treatment in a mildly acidic solution followed by drying or baking. When treated with 1% sodium metaphosphate solution (commercially called Calgon) at 25° C. the formation of a surface film is observed by the appearance of interference colors. As a rule, only glasses capable of forming a coherent silica film exhibit this phenomenon. In the present case the discovery of a surface film is attributed to the similar action of tantalum and columbium oxides remaining undissolved under the attack of the acidic medium in close association with a loose silica film which in their absence would collapse. On drying or baking this complex film hardens in a similar manner as a silica film and on reexposure to acidic media is quite stable.

Thus where a glass is prepared by the ordinary fusion of 30 parts each of silica and boric oxide, 27 parts of barium oxide, the addition of lanthanum oxide in the amount of 7.2 parts and from 2.2 to 3.5 parts of tantalum oxide each part representing a molar percent will produce a glass of greater stability and relatively high refractive index.

Alternatively in place of tantalum oxide, I have found 3.5 molar percent columbium oxide equally effective.

The glass thus produced is capable of being filmed in a phosphate solution of ordinary strength and when subsequently baked in the usual manner, the film is stabilized against staining. It is probable that the rare metals present together are instrumental in the production of the improved stable film. There is thus formed a product of abnormally low silica content which was formerly obtainable only by including a much greater proportion of silica.

The following Examples (1, 2 and 3) are representative of the improved composition given in molar percent, when compared with another known composition (4) which, however, does not contain an oxide of tantalum or columbium.

| Examples | 1 | 2 | 3 | 4 |
|---|---|---|---|---|
| $SiO_2$ | 30.0 | 26.6 | 30.0 | 26.6 |
| $B_2O_3$ | 30.0 | 28.9 | 28.9 | 25.4 |
| $Al_2O_3$ | 1.7 | 1.8 | 1.8 | 1.8 |
| BaO | 27.0 | 30.0 | 26.6 | 37.0 |
| $ZrO_2$ | 1.9 | 1.9 | 1.9 | 1.9 |
| $La_2O_3$ | 7.2 | 7.2 | 7.2 | 7.2 |
| $Ta_2O_5$ | 2.2 | 3.5 | | |
| $Cb_2O_3$ | | | 3.5 | |
| $n_D$ | 1.7 | 1.73 | 1.7 | 1.695 |

Example 4 is shown for purposes of comparison only. This composition is attacked immediately by carbonated water to form a film. However, this is not the case with the products in Examples 1, 2 and 3. When exposed to a known solution of sodium metaphosphate (marketed under the designation Calgon) it required one half hour to form a film on the surface of the composition of Example 1; one hour in Example 2 and one quarter hour in Example 3.

When the resultant films have been dried and baked at moderate temperature, the surface films become stable to further attack by sodium metaphosphate from the atmosphere or under usual operating conditions.

It is believed that the addition of either tantalum oxide or columbium oxide with the lanthanum oxide is responsible for improved stability of the otherwise known lanthanum glass.

The presence of the minor proportion of zirconia is believed to contribute also to the improvement in stability.

In each case the glass of low-silica type has been changed from a water soluble product (Example 4) to one in which filming in phosphate solution and baking accomplishes satisfactory stabilization.

The improved glass composition is markedly distinct from prior products in its composition. It will also be evident that material variation in proportions is possible within the scope of the invention as defined in the following claims:

What I claim is:

1. An optical glass composition having approximately from 26.6 to 30 molar percent of silica; 28.9 to 30 molar percent of boric oxide; 26.6 to 30 molar percent of barium oxide; 7.2 molar percent of lanthanum oxide; an oxide from the group consisting of tantalum oxide and columbium oxide and in which the tantalum oxide may have a range of 2.2 to 3.5 molar percent and the columbium oxide is present in 3.5 molar percent; and approximately 1.9 molar percent each of alumina and zirconia.

2. An optical glass composition having approximately from 26.6 to 30 molar percent of silica; 28.9 to 30 molar percent of boric oxide; 26.6 to 30 molar percent of barium oxide; 7.2 molar percent of lanthanum oxide; 2.2 to 3.5 molar percent of tantalum oxide and approximately 1.9 molar percent each of alumina and zirconia.

3. An optical glass composition having approximately 26.6 to 30 molar percent of silica; 28.9 to 30 molar percent of boric oxide; 26.6 to 30 molar percent of barium oxide; 7.2 molar percent of lanthanum oxide; 3.5 molar percent of tantalum oxide and approximately 1.9 molar percent each of alumina and zirconia.

4. An optical glass composition having approximately from 26.6 to 30 molar percent of silica; 28.9 to 30 molar percent of boric oxide; 26.6 to 30 molar percent of barium oxide; 7.2 molar percent of lanthanum oxide; 3.5 molar percent of columbium oxide and approximately 1.9 molar percent each of alumina and zirconia.

5. An optical glass composition having approximately 26.6 molar percent of silica; 28.9 molar percent of boric oxide; 30 molar percent of barium oxide; 7.2 molar percent of lanthanum oxide; 3.5 molar percent of tantalum oxide; 1.8 molar percent alumina and 1.9 molar percent zirconia.

6. An optical glass composition having approximately 30 molar percent of silica; 28.9 molar percent of boric oxide; 26.6 molar percent of barium oxide; 7.2 molar percent of lanthanum oxide; 3.5 molar percent of columbium oxide; 1.8 molar percent alumina and 1.9 molar percent zirconia.

7. An optical glass composition having approximately 30 molar percent each of silica and boric oxide; 27 molar percent of barium oxide; 7.2 molar percent of lanthanum oxide; 2.2 molar percent of tantalum oxide; 1.7 molar percent alumina and 1.9 molar percent zirconia.

8. An optical glass composed of approximately 26.6 molar percent of silica; 28.9 molar percent of boric oxide; 30 molar percent of barium oxide; 7.2 molar percent of lanthanum oxide; 3.5 molar percent of tantalum oxide; 1.8 molar percent alumina and 1.9 molar percent zirconia, the surface of said glass forming a film with a mildly acidic medium and which film is stabilized by drying and baking.

9. An optical glass composed of approximately 30 molar percent of silica; 28.9 molar percent of boric oxide; 26.6 molar percent of barium oxide; 7.2 molar percent of lanthanum oxide; 3.5 molar percent of columbium oxide; 1.8 molar percent alumina and 1.9 molar percent zirconia, the surface of said glass forming a film with a mildly acidic medium and which film is stabilized by drying and baking.

10. An optical glass having a refractive index between 1.7 and 1.73 and composed of approximately from 26.6 to 30 molar percent of silica; 28.9 to 30 molar percent of boric oxide; 26.6 to 30 molar percent of barium oxide; 7.2 molar percent of lanthanum oxide; an oxide from the group consisting of tantalum oxide and columbium oxide in which the tantalum oxide may have a range of 2.2 to 3.5 molar percent and the columbium oxide is present in 3.5 molar percent; and approximately 1.9 molar percent each of alumina and zirconia.

11. An optical glass having a refractive index between 1.7 and 1.73 and composed of approximately from 26.6 to 30 molar percent of silica; 28.9 to 30 molar percent of boric oxide; 26.6 to 30 molar percent of barium oxide; 7.2 molar percent of lanthanum oxide; an oxide from the group consisting of tantalum oxide and columbium oxide in which the tantalum oxide may have a range of 2.2 to 3.5 molar percent and the columbium oxide is present in 3.5 molar percent; and approximately 1.9 molar percent each of alumina and zirconia, said glass forming a superficial film with a mildly acidic medium and which film is stabilized by drying and baking.

NORBERT J. KREIDL.

REFERENCES CITED

The following references are of record in the file of this patent:

UNITED STATES PATENTS

| Number | Name | Date |
|---|---|---|
| 2,434,149 | DePaolis | Jan. 6, 1948 |